(12) United States Patent
Huang et al.

(10) Patent No.: US 8,808,660 B2
(45) Date of Patent: Aug. 19, 2014

(54) METHOD OF PRECIPITATION OF METAL IONS

(75) Inventors: Xiaowei Huang, Beijing (CN); Zhiqi Long, Beijing (CN); Hongwei Li, Beijing (CN); Dali Cui, Beijing (CN); Xinlin Peng, Beijing (CN); Guilin Yang, Beijing (CN); Yongke Hou, Beijing (CN); Chunmei Wang, Beijing (CN); Shunli Zhang, Beijing (CN)

(73) Assignee: Grirem Advanced Materials Co., Ltd., Beijing (CN)

( * ) Notice: Subject to any disclaimer, the term of this patent is extended or adjusted under 35 U.S.C. 154(b) by 316 days.

(21) Appl. No.: 13/145,632

(22) PCT Filed: Feb. 9, 2010

(86) PCT No.: PCT/CN2010/070570
§ 371 (c)(1),
(2), (4) Date: Jul. 21, 2011

(87) PCT Pub. No.: WO2010/088863
PCT Pub. Date: Aug. 12, 2010

(65) Prior Publication Data
US 2011/0280778 A1  Nov. 17, 2011

(30) Foreign Application Priority Data
Feb. 9, 2009  (CN) .......................... 2009 1 0077618

(51) Int. Cl.
*C01B 31/24* (2006.01)

(52) U.S. Cl.
USPC ....... 423/419.1; 423/21.1; 423/422; 423/138; 423/140

(58) Field of Classification Search
USPC ....................................... 423/21.1
See application file for complete search history.

(56) References Cited

U.S. PATENT DOCUMENTS 6,015,447 A    1/2000  Gorge et al.

FOREIGN PATENT DOCUMENTS

| CN | 1185763 A | | 6/1998 |
|----|-----------|---|--------|
| CN | 1394810 A | | 2/2003 |
| CN | 1470460 A | | 1/2004 |
| CN | 1470460 A | * | 1/2004 |
| CN | 1539774 A | | 10/2004 |
| JP | 53-102204 A | | 9/1978 |
| RU | 1835387 A1 | * | 8/1993 |

* cited by examiner

*Primary Examiner* — Melissa Stalder
(74) *Attorney, Agent, or Firm* — Birch, Stewart, Kolasch & Birch, LLP

(57) ABSTRACT

The present invention relates to a method of precipitation of metal ions. Mineral(s), oxide(s), hydroxide(s) of magnesium and/or calcium are adopted as raw materials, and the raw material(s) is processed through at least one step of calcination, slaking, or carbonization to produce aqueous solution(s) of magnesium bicarbonate and/or calcium bicarbonate, and then the solution(s) is used as precipitant(s) to deposit rare earth, such as nickel, cobalt, iron, aluminum, gallium, indium, manganese, cadmium, zirconium, hafnium, strontium, barium, copper and zinc ions. And at least one of metal carbonates, hydroxides or basic carbonates is obtained, or furthermore the obtained products are calcined to produce metal oxides. The invention takes the cheap calcium and/or magnesium minerals or their oxides, hydroxides with low purity as raw materials to instead common precipitants such as ammonium bicarbonate and sodium carbonate etc. The calcium, magnesium, carbon dioxide etc are efficiently and circularly used, and the environment pollution by ammonium-nitrogen wastewater, high concentration salts wastewater is avoided, and both of the discharge of greenhouse gas carbon dioxide and the production cost of metal are decreased.

21 Claims, No Drawings

METHOD OF PRECIPITATION OF METAL IONS

FIELD OF THE INVENTION

The present invention relates to a method of precipitation of metal ions. Specifically speaking, mineral(s), oxide(s), or hydroxide(s) of magnesium and/or calcium are used as raw materials, which are processed through at least one step of calcination, hydration and carbonation to produce aqueous solution(s) of magnesium bicarbonate or/and calcium bicarbonate, and then the solution(s) is used as precipitant(s) to precipitate metal ions, and subsequently at least one of metal carbonate, metal hydroxide or metal basic carbonate is obtained, or the obtained product(s) is further calcined to produce metal oxides. This invention belongs to the field of hydrometallurgy.

BACKGROUND OF THE INVENTION

So far, the compounds of lanthanum, cerium, praseodymium, neodymium, samarium, europium, gadolinium, terbium, dysprosium, holmium, erbium, thulium, ytterbium, lutetium, yttrium, scandium, nickel, cobalt, iron, aluminium, gallium, indium, manganese, cadmium, zirconium, hafnium, strontium, barium, copper and zinc etc are the most common inorganic compounds in industry. They are widely used in the field of metallurgy, machinery, petroleum chemical industry, light industry, electronic information, energy, environmental protection, defence military industry, new-high tech materials etc. They are the crucial and indispensable raw materials for developing new-high technology and top national defense technology, and also reforming traditional industry all over the world. Therefore, they become the important strategic resources in new technology revolution and international competition.

The metal resources in the world are abundant, and new resources are discovered continuously. Generally, metal concentrate is firstly decomposed and leached by acid or alkali etc to obtain mixed-metal-ions solution of chloride, sulfate or nitrate etc. And then purification and separation methods, such as solvent extraction, redox method, ion exchange or extraction-chromatography method etc, are used to obtain single metal solution, for example, single metal chloride, single metal sulfate, or single metal nitrate etc. Next, the mentioned single metal solution is generally precipitated using oxalic acid, and then calcined to produce metal oxide. The product obtained from this method possesses high purity. However, as oxalic acid is expensive, the production cost is high, and moreover, a lot of oxalic acid wastewater is produced. Some product is obtained as metal carbonate by using ammonium bicarbonate as precipitant, and also metal oxide is obtained by calcination. Or if ammonium hydroxide is used as precipitant, the metal hydroxide is obtained. The cost of using ammonium bicarbonate or hydroxide as precipitant declines significantly, but at the same time a lot of ammonium-nitrogen wastewater is produced leading to environment pollution. The disposal cost of ammonium-nitrogen wastewater is very high, and it is difficult to meet the emission standard. In order to avoid the pollution of ammonium-nitrogen wastewater, some companies use sodium carbonate or sodium hydroxide instead of ammonium bicarbonate or ammonium hydroxide as precipitant to produce metal carbonate, metal hydroxide or metal oxide. However, the cost increases about one time, and the pollution of sodium salt wastewater occurs.

CONTENTS OF THE INVENTION

In order to further reduce the production cost of metals or metal oxides and avoid the environmental pollution of the ammonium-nitrogen wastewater, this invention presents a new method of precipitating metal ions, wherein mineral(s), oxide(s), hydroxide(s) of magnesium or/and calcium with low price are used as raw materials, which are processed through at least one step of calcination, hydration and carbonation to produce solution(s) of magnesium bicarbonate or/and calcium bicarbonate, and then the solution(s) is used as precipitant(s) to precipitate the metal ions, and subsequently at least one of metal carbonates, metal hydroxides and metal basic carbonates is obtained, or the obtained product is further calcined to produce metal oxide.

Magnesium bicarbonate and/or calcium bicarbonate exist as solution with low solubility. They are not stable, and by heating they will decompose and form magnesium or/and calcium carbonate or precipitate(s) of basic carbonate. Therefore, they are not common products. The present invention uses mineral(s), oxide(s), hydroxide(s) of magnesium or/and calcium with low purity as raw materials, and these raw materials are processed through at least one step of calcination, hydration, and carbonation to produce solution(s) of magnesium bicarconate or/and calcium bicarbonate. By controlling the temperature of carbonation and the concentration, and keeping carbon dioxide in solution being saturated, the magnesium bicarbonate and/or calcium bicarbonate could keep stable at a certain concentration in solution. The precipitating mother liquor containing magnesium is used to produce magnesium hydroxide through alkali conversion. And then the magnesium hydroxide is used for carbonation to prepare magnesium bicarbonate. At the same time, carbon dioxide, which is produced from calcination of the magnesium and calcium minerals or their metal carbonate, is collected for the carbonation to prepare magnesium bicarbonate and/or calcium bicarbonate. The resources are efficiently recycled in the whole process, and $CO_2$ emission and wastewater pollution can be efficiently avoided. More importantly, the production cost of metals declines a lot.

The Specific Technique Methods of this Invention are:

This invention presents a new method of precipitation of metal ions, wherein magnesium bicarbonate and/or calcium bicarbonate aqueous solution is used as precipitant, which is mixed with metal salt solution, and the pH value of mother liquor is controlled within the range of 4.5~8 to precipitate the metal ions, and then after post-treatment, at least one of metal carbonate, metal hydroxide, and metal basic carbonate is obtained.

The said method of precipitation of metal ions is presented as follows: metal salt solution is mixed with magnesium bicarbonate and/or calcium bicarbonate solution which is saturated with carbon dioxide to precipitate the metal ions, in which the reaction temperature is 0° C.~95° C., the reaction time is 0.5~5 hours, and the pH value of mother liquor is 5~7. And through at least one step of aging, filtration, washing and drying, at least one of metal carbonate, metal hydroxide and metal basic carbonate is obtained.

The said metal carbonate, metal hydroxide, metal basic carbonate or their mixture is calcined at 600~1100° C. for 0.5~2 hours, and subsequently the metal oxide is obtained.

The metal ion in the said metal salt solution is at least one of lanthanum, cerium, praseodymium, neodymium, samarium, europium, gadolinium, terbium, dysprosium, holmium, erbium, thulium, ytterbium, lutetium, yttrium, scandium, nickel, cobalt, iron, aluminium, gallium, indium, manganese, cadmium, zirconium, hafnium, strontium, barium, copper and zinc.

The said magnesium bicarbonate and/or calcium bicarbonate solution contains 5~100 g/L of magnesium oxide and/or calcium oxide. The quantity of magnesium oxide and/or calcium oxide is 101 wt %~150 wt % of the theoretical quantity. The content of Fe which is measured by weight is below 5 ppm, and that of Al is below 5 ppm. The optimum condition is: the magnesium bicarbonate and/or calcium bicarbonate solution contains 5~30 g/L of magnesium oxide and/or calcium oxide, and the quantity of magnesium oxide and/or calcium oxide is 101 wt %~130 wt % of the theoretical quantity, and the content of Fe which is measured by weight is below 2 ppm, and that of Al is below 2 ppm.

The said metal salt solution is chloride solution, nitrate solution, sulfate solution, acetate solution, carboxylate solution, naphthenate solution, citrate solution or a mixture of these solutions. The concentration of the metal ion in the solution is 0.01~2.0 mol/L. The said metal ions react with magnesium bicarbonate and/or calcium bicarbonate to produce carbon dioxide. The carbon dioxide is collected to prepare the magnesium bicarbonate and/or calcium bicarbonate aqueous solution.

The said magnesium bicarbonate and/or calcium bicarbonate aqueous solution is prepared by calcination, hydration and carbonation of magnesium or/and calcium minerals.

The said magnesium bicarbonate solution is prepared by calcination, hydration and carbonation of at least one of magnesite, brucite, dolomite, magnesium carbonate.

The said calcination process is to calcine the minerals at 700~1000° C. for 1~5 hours. The said hydration process is to add water into the magnesium oxide and/or calcium oxide obtained from the calcination to carry out hydration, the hydration temperature is 50~95° C., the hydration time is 0.5~5 hours, and the weight ratio of water to magnesium oxide and/or calcium oxide is 1~5:1, and subsequently, water is further added to prepare slurry at the weight ratio of water to magnesium oxide and/or calcium oxide of 10~200:1. The said carbonation process is performed after the hydration, carbon dioxide is pumped into the slurry to carry out carbonation, the temperature is controlled at 0~50° C., the reaction time is 0.1~5 hours. And after filtration, pure magnesium bicarbonate and/or calcium bicarbonate solution is obtained.

The carbon dioxide produced from the said calcination process is collected and recycled to prepare the magnesium bicarbonate and/or calcium bicarbonate aqueous solution.

The method of preparing the said magnesium bicarbonate solution is that: firstly, water is added into the magnesium oxide for hydration, the hydration temperature is 50~95° C., the hydration time is 0.5∞5 hours, and the weight ratio of water to magnesium oxide is 1~5:1; secondly, water is further added into the mixture to prepare shiny or added into magnesium hydroxide to prepare slurry at the weight ratio of water to magnesium oxide of 10~200:1; thirdly, carbon dioxide is pumped into the slurry for carbonation, the temperature is controlled at 0~50° C., the reaction time is 0.1~5 hours. And after filtration, pure magnesium bicarbonate solution is obtained.

The method of preparing the said magnesium bicarbonate solution is that: using magnesium salt as raw materials to prepare the magnesium bicarbonate solution, and the specific steps are presented as follows:

1) preparation of magnesium hydroxide: adding liquid or solid basic compound which is more alkaline than magnesium hydroxide into the magnesium salt solution or the solution which is prepared by dissolving solid magnesium salt with water, alkali conversion occurs. And after the reaction, magnesium hydroxide slurry is obtained, or a filter cake of magnesium hydroxide is obtained after further filtration.

2) preparation of magnesium bicarbonate solution: carbon dioxide is pumped into the magnesium hydroxide slurry obtained from the step 1) or the slurry which is prepared by adding water into the filter cake of magnesium hydroxide obtained from the step 1) for carbonation.

The magnesium salt in the step 1) is at least one of magnesium chloride or magnesium nitrate.

The said magnesium salt solution in the step 1) is at least one solution of magnesium chloride, magnesium nitrate, magnesium acetate and magnesium citrate, or at least one of brine and seawater, and the mother liquor which contains magnesium ions and is produced from the precipitating process of the metal ions. The concentration of the said magnesium salt solution is 10~300 g/L (measured by weight of magnesium oxide). The optimized condition is that the concentration of the said magnesium salt solution is 10~200 g/L (measured by weight of magnesium oxide).

The said basic compound in the step 1) is at least one of calcium hydroxide, sodium hydroxide, potassium hydroxide, calcium hydroxide obtained from hydration of calcium oxide, and the mixture of calcium hydroxide and magnesium hydroxide obtained from hydration of light-burned dolomite.

The said basic compound in the step 1) is calcium hydroxide obtained from hydration of calcium oxide or a mixture of calcium hydroxide and magnesium hydroxide obtained from hydration of light-burned dolomite.

The quantity of said basic compound in the step 1) is 1~1.5 times of the theoretical stoichiometric amount, the reaction temperature is 15~95° C., and the reaction time is 10~180 minutes.

During the process of adding water into the said magnesium hydroxide slurry or the filter cake mentioned in the step 2), the weight ratio of water to magnesium oxide is 10~200:1; and during the said carbonation process, the temperature is controlled at 0~35° C. A pure magnesium bicarbonate solution (containing 5~30 g/L of magnesium oxide) is obtained after filtration.

The method of preparing the said calcium bicarbonate solution is that: at least one of calcium carbonate, limestone, marble and dolomite is sprayed directly by water and simultaneously carbon dioxide is introduced to perform carbonation, and thus pure calcium bicarbonate is obtained.

Advantages of this Invention

In this invention, pure calcium bicarbonate and/or magnesium bicarbonate solution is used instead of ammonium bicarbonate or sodium bicarbonate as precipitant to prepare at least one of metal carbonate, metal hydroxide and metal basic carbonate, or to produce metal oxide which is obtained through calcination. The advantages of this invention are shown as follows:

1. Minerals (containing calcium and magnesium) or oxides and hydroxides (containing calcium and magnesium) with low grade (purity) are used as raw materials. During the carbonation process, the magnesium or calcium ions enter into the solution, while some impurities such as silicon, ferrous, aluminum etc enter into residue, which are removed by filtration. Therefore, the raw materials of magnesium or calcium used in this invention do not need high quality (purity). These raw materials are abundant and cheap in nature, and have extensive source.

2. There is no ammonium-nitrogen wastewater during the precipitation. The mother liquor containing magnesium ions obtained from the precipitation process is used for preparing magnesium hydroxide by alkali conversion. Then the magnesium hydroxide is used for preparing calcium bicarbonate by carbonation. And the circulation utilization of water is high.

3. The carbon dioxide which is produced from calcination of magnesium or calcium minerals, or their carbonate, can be collected for carbonation to prepare magnesium bicarbonate and/or calcium bicarbonate. The resource is used efficiently and circularly. The environmental pollution of carbon dioxide emission and wastewater can be avoided, and the production cost of metals decreases greatly.

SPECIFIC MODE FOR CARRYING OUT THE INVENTION

The following examples shall serve to further illustrate the various methods and applications of the present invention. The protection scope of this invention is not limited by these examples, but it is determined by the claims.

Example 1

A light-burned magnesia, made from calcination of magnesium carbonate (Si 2.5 wt %, Fe 0.9 wt %, Al 0.5 wt %) at 750-850° C. for 5 hours, is hydrated for 2 hours at 80° C. The weight ratio of water to magnesium oxide is 1:1. Then water is added into the mixture to prepare slurry at a weight ratio of water to magnesium oxide of 40:1. After that, carbon dioxide (90 vt %) is introduced into the slurry to react for 30 minutes at 20° C. Subsequently, a pure magnesium bicarbonate solution (MgO: 23 g/L, Fe: 1.1 ppm, Al: 1.0 ppm) is obtained after clarification and filtration Adding 5.6 m$^3$ of the above magnesium bicarbonate solution (0.50 mol/L) into a reactor containing 6 m$^3$ of cerium nitrate solution to react for 2 hours, and controlling the reaction temperature at 35° C. and the pH value of mother liquor at 5.7, cerium carbonate can be obtained. And then the cerium carbonate is filtered, washed, dried, and finally calcined at 650° C. for 5 hours to produce cerium dioxide.

The carbon dioxide, produced from the calcination process of cerium carbonate, is collected to prepare magnesium bicarbonate solution.

Example 2

A light-burned magnesia, made from calcination of magnesite (Si 3.2 wt %, Fe 0.7 wt %, Al 0.37 wt %) at 900° C. for 2 hours, is hydrated for 2 hours at 80° C. The weight ratio of water to magnesium oxide is 2:1. Then water is added into the mixture to prepare slurry at a weight ratio of water to magnesium oxide of 57:1. After that, carbon dioxide (80 vt %) is introduced into the slurry to react for 2 hours at 20° C. Subsequently, a pure magnesium bicarbonate solution (MgO: 15.3 g/L, Fe: 1.51 ppm, Al: 1.2 ppm) is obtained after filtration.

Adding 7 liters of the above magnesium bicarbonate solution into a reactor containing 1.6 liters of lanthanum chloride solution (0.92 mol/L) to react for 2 hours, and controlling the reaction temperature at 50° C. and the pH value of mother liquor at 6.5, the rare-earth (RE) ions can be completely precipitated, and then lanthanum carbonate is obtained after filtration.

The carbon dioxide, produced from the calcination of magnesite, is collected to prepare magnesium bicarbonate solution.

Example 3

A mixture of magnesium oxide and calcium oxide, prepared from calcination of dolomite at 900° C. for 2 hours, is hydrated for 5 hours at 50° C. The weight ratio of water to magnesium/calcium oxide is 5:1. Then water is added into the mixture to prepare slurry at a weight ratio of water to magnesium/calcium oxide of 190:1. After that, carbon dioxide (75 vt %) is introduced into the slurry to react for 2 hours at 25° C. Subsequently, a pure aqueous solution of magnesium bicarbonate and calcium bicarbonate (MgO+CaO (90 wt % MgO): 5.1 g/L, Fe: 1.1 ppm, Al: 0.7 ppm) is obtained after clarification and filtration.

Adding 2 m$^3$ of samarium chloride solution (2.0 mol/L) into a reactor containing 55 m$^3$ of the above magnesium bicarbonate and calcium bicarbonate solution to react for 1 hour at 95° C., and controlling the pH value of mother liquor at 6.0, samarium carbonate slurry can be obtained. And then the obtained slurry is filtered, washed and finally dried to produce samarium carbonate.

The carbon dioxide, produced from the calcination of dolomite, is collected to prepare magnesium bicarbonate and calcium bicarbonate solution.

Example 4

Magnesium oxide is hydrated for 0.5 hours at 95° C. The weight ratio of water to magnesium oxide is 2:1. Then water is added into the mixture to prepare slurry at a weight ratio of water to magnesium oxide of 50:1. After that, carbon dioxide (85 vt %) is introduced into the slurry to react for 3.5 hours at 18° C. Subsequently, a pure magnesium bicarbonate solution (MgO: 17.2 g/L, Fe: 3.5 ppm, Al: 2.2 ppm) is obtained after clarification and filtration.

Adding 5.3 m$^3$ of the above magnesium bicarbonate solution into a reactor containing 9.2 m$^3$ of mixture of lanthanum, cerium, praseodymium and neodymium sulfate solution (0.15 mol/L) to react. for 1.5 hours at 25° C., and controlling the pH value of mother liquor at 5.7, RE ions are precipitated and RE carbonate are obtained. And then the RE carbonate is filtered, washed, dried and finally calcined at 750° C. for 5 hours to produce a mixture of lanthanum, cerium, praseodymium and neodymium oxide.

The carbon dioxide, produced from the calcination process, is collected to prepare magnesium bicarbonate and calcium bicarbonate solution.

Example 5

Magnesium oxide is hydrated for 1.5 hours at 85° C. The weight ratio of water to magnesium oxide is 2:1. Then water is added into the mixture to prepare slurry at a weight ratio of water to magnesium oxide of 30:1. After that, carbon dioxide (85 vt %) is introduced into the slurry to react. for 3.5 hours at 18° C. Subsequently, a pure magnesium bicarbonate solution (MgO: 29.2 g/L, Fe: 1.5 ppm, Al: 0.3 ppm) is obtained after clarification and filtration.

Adding 6 m$^3$ of neodymium chloride solution (1.5 mol/L) into a reactor containing 27.5 m$^3$ of the above magnesium bicarbonate solution to react for 3 hour at 35° C., and controlling the pH value of mother liquor at 8.0, neodymium ions are precipitated, and then neodymium carbonate is obtained after filtration, washing and drying. At last, neodymium oxide is obtained from calcination of neodymium carbonate at 650° C. for 2 hours.

Adding 1635 kg of calcium hydroxide (CaO 75%) into 30 m$^3$ of mother liquor containing $MgCl_2$, and stirring the mixture for 2 hours at 25° C., a magnesium hydroxide slurry can be obtained. Then carbon dioxide (85 vt %) produced from the calcination process, is introduced into the slurry on stirring to carry out carbonation for 2 hours. After filtration, a pure magnesium bicarbonate solution is obtained and then recycled to precipitate neodymium ions.

Example 6

Water is added into magnesium hydroxide to prepare slurry at a weight ratio of water to magnesium oxide of 60:1. Then carbonate dioxide (90 vt %) is introduced into the slurry to react for 5 hours at 0° C. Subsequently, a pure magnesium bicarbonate solution (MgO: 15.2 g/L, Fe: 0.8 ppm, Al: 0.7 ppm) is obtained after clarification and filtration.

Adding 6.7 m$^3$ of the above magnesium bicarbonate solution into a reactor containing 6 m$^3$ of neodymium citrate solution (0.27 mol/L) to react for half an hour at 35° C., and controlling the pH value of mother liquor at 5.7, RE ions are precipitated. And then neodymium carbonate is obtained after 12-hours-aging, filtration, washing and drying.

Example 7

Sodium hydroxide (30%) is added into a magnesium nitrate solution (5.0 mol/L, MgO content: 200 g/L) at a molar ratio of sodium to magnesium of 2. Controlling the reaction for 25 minutes at 20° C., a magnesium hydroxide slurry can be obtained. After filtration, a filter cake of magnesium hydroxide is obtained. Then water is added into the filter cake to prepare slurry at a weight ratio of water to magnesium oxide of 30:1. After that, carbon dioxide (90 vt %) is introduced into the slurry to carry out carbonation at 25° C. Subsequently, a magnesium bicarbonate solution (MgO: 30 g/L, Fe: 0.3 ppm, Al: 0.4 ppm) is obtained after clarification and filtration.

Adding 1.5 m$^3$ of the above magnesium bicarbonate solution into a reactor containing 3 m$^3$ of cobalt sulfate solution (0.37 mol/L) to react for 1 hour at 35° C., and controlling the pH value of mother liquor at 4.5, the cobalt ions are completely precipitated, and then cobalt carbonate is obtained after filtration, washing and drying.

Example 8

Calcium oxide powder is hydrated for 60 minutes at 80° C. at a weight ratio of water to calcium oxide of 2.5:1 to prepare calcium hydroxide slurry. Brine is added into the calcium hydroxide slurry at a molar ratio of Ca/Mg of 1.2:1 to react for 60 minutes at 25° C., and then a magnesium hydroxide slung is obtained. A filter cake of magnesium hydroxide obtained by filtering the magnesium hydroxide slurry is mixed with water to further prepare slurry at a weight ratio of water to magnesium oxide of 50:1. After that, carbon dioxide is introduced into the slurry to carry out carbonation at 20° C. Subsequently, a magnesium bicarbonate solution (MgO: 18.6 g/L, Fe: 1.7 ppm, Al: 0.3 ppm) is obtained after clarification and filtration.

Adding 3.8 m$^3$ of the above magnesium bicarbonate solution into a reactor containing 1.1 m$^3$ of strontium chloride solution (1.0 mol/L) to react for 1 hour at 35° C., and controlling the pH value of mother liquor at 7, strontium carbonate slurry can be obtained. And then the obtained slurry is filtered, washed and dried to produce strontium carbonate.

Example 9

Adding 3 m$^3$ of magnesium bicarbonate solution (MgO: 18.6 g/L, Fe: 1.7 ppm, Al: 0.3 ppm) into a reactor containing 2.2 m$^3$ of nickel nitrate solution (0.5 mol/L) to react for 5 hours at 0° C., and controlling the pH value of mother liquor at 7.2, metal ions can be precipitated, and then a mixture of nickel carbonate and basic nickel carbonate is obtained after filtration, washing and drying.

Example 10

Adding 2.2 m$^3$ of magnesium bicarbonate solution (MgO: 20.5 g/L, Fe: 1.2 ppm, Al: 0.8 ppm, saturated with $CO_2$) into a reactor containing 2.0 m$^3$ of manganese chloride solution (0.5 mol/L) to react for 2 hours at 50° C., and controlling the pH value of mother liquor at 7.0, manganese ions are precipitated. And then manganese oxide can be obtained after filtration, washing, drying and final calcination for half an hour at 1100° C.

The carbon dioxide, produced from the calcination process, is collected and recycled to prepare magnesium bicarbonate solution.

Example 11

Adding 6 m$^3$ of magnesium bicarbonate solution (MgO: 15.2 g/L, Fe: 0.3 ppm, Al: 0.5 ppm) into a reactor containing 3 m$^3$ of zirconium nitrate and hafnium nitrate solution (0.37 mol/L) to react for 1 hour at 35° C., and controlling the pH value of mother liquor at 5.7, zirconium and hafnium carbonate can be obtained after filtration, washing and drying.

Example 12

Adding 2.3 m$^3$ of magnesium bicarbonate solution (MgO: 18.6 g/L, Fe: 1.7 ppm, Al: 0.3 ppm) into a reactor containing 1.4 m$^3$ of gallium nitrate solution (0.5 mol/L) to react for 1 hour at 25° C., and controlling the pH value of mother liquor at 5.2, metal ions are precipitated, and then gallium oxide is obtained after filtration, washing, drying and calcination.

The carbon dioxide, produced from the calcination process, is collected and recycled to prepare magnesium bicarbonate solution.

Example 13

Adding 2.3 m$^3$ of magnesium bicarbonate solution (MgO: 20.5 g/L, Fe: 1.2 ppm, Al: 0.8 ppm, saturated with $CO_2$) into a reactor containing 2.2 m$^3$ of barium chloride solution (0.5 mol/L) to react for 15 minutes at 50° C., and controlling the pH value of mother liquor at 7.5, barium ions are precipitated, and then barium oxide is obtained after filtration, washing, drying and calcination for 2 hours at 900° C.

The carbon dioxide, produced from the calcination process, is collected and recycled to prepare magnesium bicarbonate solution.

Example 14

Adding 6.7 m$^3$ of calcium bicarbonate solution (CaO: 28.2 g/L, Fe: 0.3 ppm, Al: 0.5 ppm) into a reactor containing 6 m$^3$ of ferric chloride solution (0.37 mol/L) to react for 1 hour at 35° C., and controlling the pH value of mother liquor at 4.7, Fe ions are precipitated, and then ferric hydroxide is obtained after filtration, washing and drying.

Example 15

Adding 7.3 m$^3$ of magnesium bicarbonate solution (MgO: 30 g/L, Fe: 0.3 ppm, Al: 0.4 ppm) into a reactor containing 12 m³ of aluminum nitrate solution (0.3 mol/L) to react for 1 hour at 35° C., and controlling the pH value of mother liquor at 5.5, metal ions are precipitated, and then aluminum hydroxide is obtained after filtration, washing and drying.

Example 16

Adding 2.5 m³ of magnesium bicarbonate solution (MgO: 18.6 g/L, Fe: 1.7 ppm, Al: 0.3 ppm) into a reactor containing 2.2 m³ of copper sulfate solution (0.5 mol/L) to react for 1 hour at 25° C., and controlling the pH value of mother liquor at 5.2, copper ions are precipitated and basic copper carbonate is obtained. Subsequently, copper oxide is obtained after filtration, washing and calcination.

Example 17

Adding 1.72 m³ of magnesium bicarbonate solution (MgO: 20.5 g/L, Fe: 1.2 ppm, Al: 0.8 ppm, saturated with $CO_2$) into a reactor containing 2.2 m³ of zinc sulfate solution (0.35 mol/L) to react for half an hour at 50° C., and controlling the pH value of mother liquor at 5.5, zinc irons are precipitated. And then zinc oxide is obtained after filtration, washing, drying and calcination for 2 hours at 900° C.

The carbon dioxide, produced from the calcination process, is collected and recycled to prepare magnesium bicarbonate solution.

Example 18

Adding 2.2 m³ of calcium bicarbonate solution (CaO: 45.2 g/L, Fe: 0.3 ppm, Al: 0.5 ppm) into a reactor containing 3 m³ of indium nitrate solution (0.35 mol/L) to react for 1 hour at 35° C., and controlling the pH value of mother liquor at 7.5, indium ions are precipitated. And then indium oxide is obtained after filtration, washing, drying and calcination.

The carbon dioxide, produced from the calcination process, is collected and recycled to prepare calcium bicarbonate solution.

Example 19

Adding 0.5 m³ of magnesium bicarbonate solution (MgO: 15 g/L, Fe: 1.1 ppm, Al: 0.5 ppm, saturated with $CO_2$) into a reactor containing 10 m³ of mixed RE sulfate solution (La, Ce, Pr, Nd, Sm, Eu, Gd, Tb, Dy, Ho, Er, Tm, Yb, Lu, Y, total content of REO: 0.01 mol/L) to react for 1 hour at 25° C., and controlling the pH value of mother liquor at 5.5, RE ions are precipitated. And then mixed RE oxide can be obtained after filtration, washing, drying and calcination for 2 hours at 700° C.

The carbon dioxide, produced from the calcination process, is collected and recycled to prepare magnesium bicarbonate solution.

Example 20

Adding 9 m³ of magnesium bicarbonate solution (MgO: 15 g/L, Fe: 1.1 ppm, Al: 0.5 ppm, saturated with $CO_2$) into a reactor containing 10 m³ of neodymium acetate solution (0.2 mol/L) to react for 2 hours at 25° C., and controlling the pH value of mother liquor at 5.5, neodymium ions are precipitated and neodymium carbonate is obtained. Subsequently, the neodymium carbonate is filtered, washed, dried and finally calcined at 700° C. for 2 hours to produce neodymium oxide.

The carbon dioxide, produced from the calcination process, is collected and recycled to prepare magnesium bicarbonate solution.

Example 21

Adding 2.6 m³ of calcium bicarbonate solution (CaO: 100 g/L, Fe: 1.2 ppm, Al: 0.8 ppm, saturated with $CO_2$) into a reactor containing 12 m³ of cadmium chloride solution (0.5 mol/L) to react for 1 hour at 50° C., and controlling the pH value of mother liquor at 7, cadmium ions are precipitated. And then cadmium oxide is obtained after filtration, washing, drying and calcination for half an hour at 700° C.

The carbon dioxide, produced from the calcination process, is collected and recycled to prepare calcium bicarbonate solution.

Example 22

Water is sprayed to limestone particles at 25° C., while carbonate dioxide (99 vt %) is introduced into the system to carry out carbonation. After clarification and filtration, a pure calcium bicarbonate solution (CaO: 16 g/L, Fe: 0.6 ppm, Al: 0.4 ppm) can be obtained.

Adding 6 m³ of scandium chloride solution (0.5 mol/L) into a reactor containing 18.3 m³ of the above calcium bicarbonate solution to react for 3 hours at 35° C., and controlling the pH value of mother liquor at 8.0, scandium ions are precipitated. And then scandium carbonate is obtained after filtration, washing and drying.

Example 23

Adding 3 m³ of cerium chloride solution (1.5 mol/L) into a reactor containing 14 m³ of magnesium bicarbonate solution (MgO: 29.2 g/L, Fe: 1.5 ppm, Al: 0.3 ppm) to react for 3 hours at 35° C., and controlling the pH value of mother liquor at 7.5, cerium ions are precipitated. And then cerium carbonate is obtained after filtration, washing and drying.

Adding 1048 kg of mixture of calcium hydroxide (62%) and magnesium hydroxide (30%) obtained from hydration of light-burned dolomite into 15 m³ of mother liquor containing $MgCl_2$ (MgO: 23.03 g/L), to react for 1 hour at 25° C., a filter cake of magnesium hydroxide is obtained after filteration. Water is then added into the filter cake of magnesium hydroxide to prepare slurry at a weight ratio of water to magnesium oxide of 30:1, and carbon dioxide (70 vt %) produced from the light-burned dolomite is introduced into the slurry on stirring to carry out carbonation at 20° C. for 1 hour. Subsequently, a pure magnesium bicarbonate solution (MgO: 29.0 g/L) is obtained after filtration and then recycled to prepare neodymium carbonate.

The invention claimed is:

1. A precipitation method of at least one metal ion, wherein magnesium and/or calcium minerals are calcined and hydrated to get magnesium hydroxide and/or calcium hydroxide, which are further carbonated to obtain magnesium bicarbonate and/or calcium bicarbonate aqueous solution as at least one precipitant, and the magnesium bicarbonate and/or calcium bicarbonate aqueous solution is mixed with at least one metal salt solution, and a pH value of mother liquor is controlled within a range of 4.5~8 to precipitate the at least one metal ion, and then, at least one selected from the group consisting of metal carbonate, metal hydroxide, and metal basic carbonate is obtained, during which carbon dioxide produced from a metal ion precipitation reaction between magnesium bicarbonate and/or calcium bicarbonate and the at least one metal ion is collected and recycled to precipitate the magnesium bicarbonate and/or calcium bicarbonate solution.

2. A precipitation method of at least one metal ion, wherein magnesium minerals or minerals containing magnesium and calcium are calcined and hydrated to get magnesium hydroxide or mixtures of magnesium hydroxide and calcium hydroxide, in which magnesium salt is added to calcium hydroxide to obtain magnesium hydroxide, and the magnesium hydroxide is further carbonated to obtain carbon dioxide saturated magnesium bicarbonate aqueous solution as at least one precipitant, and the carbon dioxide saturated magnesium bicarbonate aqueous solution is mixed with metal salt solution with a reaction temperature ranging from 0-95° C., reaction time ranges from 0.5-5 hours, and pH value of mother liquor ranging from 5-7 to precipitate the at least one metal ion, and through at least one of a post-treatment step of aging, filtrating, washing and drying, at least one of metal carbonate, metal hydroxide and metal basic carbonate is obtained, while carbon dioxide produced from a metal ion precipitation reaction is collected and recycled to precipitate the magnesium bicarbonate solution.

3. The precipitation method of metal ions according to claim 1, wherein the metal carbonate, metal hydroxide, metal basic carbonate or their mixture is calcined at 600~1100° C. for 0.5~12 hours, and subsequently metal oxide is obtained.

4. The precipitation method of metal ions according to claim 1, wherein the metal ion of the said metal salt solution is at least one ion selected from the group consisting of lanthanum, cerium, praseodymium, neodymium, samarium, europium, gadolinium, terbium, dysprosium, holmium, erbium, thulium, ytterbium, lutetium, yttrium, scandium, nickel, cobalt, iron, aluminium, gallium, indium, manganese, cadmium, zirconium, hafnium, strontium, barium, copper and zinc.

5. The precipitation method of metal ions according to claim 1, wherein the metal ion of the said metal salt solution is at least one ion selected from the group consisting of lanthanum, cerium, praseodymium, neodymium, samarium, europium, gadolinium, terbium, dysprosium, holmium, erbium, thulium, ytterbium, lutetium and yttrium.

6. The precipitation method of metal ions according to claim 1, wherein the magnesium bicarbonate and/or calcium bicarbonate solution contains 5~100 g/L of magnesium oxide and/or calcium oxide, a quantity of which is 101 wt%~150 wt% of a theoretical quantity; a content of Fe by weight is below 5 ppm, and a content of Al is below 5 ppm.

7. The precipitation method of metal ions according to claim 1, wherein the magnesium bicarbonate and/or calcium bicarbonate solution contains 5~30 g/L of magnesium oxide and/or calcium oxide, and a quantity of the magnesium oxide and/or calcium oxide is 101 wt %-130 wt % of a theoretical quantity, and a content of Fe by weight is below 2 ppm, and a content of Al is below 2 ppm.

8. The precipitation method of metal ions according to claim 1, wherein the metal salt solution is chloride solution, nitrate solution, sulfate solution, acetate solution, carboxylate solution, naphthenate solution, citrate solution or a mixture of these solutions, and a concentration of the metal ion in the solution is 0.01~2.0 mol/L.

9. The precipitation method of metal ions according to claim 1, wherein the magnesium bicarbonate solution is prepared by calcination, hydration and carbonation of at least one selected from the group consisting of magnesite, brucite, dolomite, and magnesium carbonate.

10. The precipitation method of metal ions according to claim 1, wherein the magnesium and/or calcium minerals are calcined at 700~1000° C. for 1~5 hours to obtain magnesium oxide and/or calcium oxide; the magnesium oxide and/or calcium oxide are hydrated by adding water into the magnesium oxide and/or calcium oxide to carry out hydration, a hydration temperature is 50~95° C., a hydration time is 0.5~5 hours, and a weight ratio of water to magnesium oxide and/or calcium oxide is 1-5:1, and subsequently water is further added to prepare slurry at a weight ratio of water to magnesium oxide and/or calcium oxide of 10~200:1; the carbonation process is performed after the hydration, carbon dioxide is pumped into the slurry to carry out carbonation, a temperature is controlled at 0~50° C., a reaction time is 0.1~5 hours, and after filtration, pure magnesium bicarbonate and/or calcium bicarbonate solution is obtained.

11. The precipitation method of metal ions according to claim 1, wherein carbon dioxide produced from the magnesium and/or calcium minerals being calcined is collected and recycled to prepare the magnesium bicarbonate and/or calcium bicarbonate solution.

12. The precipitation method of metal ions according to claim 1, wherein the magnesium bicarbonate solution is obtained by: firstly, water is added into magnesium oxide for hydration, a hydration temperature is 50~95° C., a hydration time is 0.5~5 hours, and a weight ratio of water to magnesium oxide is 1~5:1; secondly, water is further added into the mixture to prepare slurry or added into magnesium hydroxide to prepare slurry at a weight ratio of water to magnesium oxide of 10~200:1; thirdly, carbon dioxide is pumped into the slurry for carbonation, a temperature is controlled at 0~50° C., a reaction time is 0.1~5 hours, and after filtration, pure magnesium bicarbonate solution is obtained.

13. The precipitation method of metal ions according to claim 1, wherein the magnesium bicarbonate solution is prepared by using magnesium salt as raw material, comprising:
   1) preparation of magnesium hydroxide: liquid or solid basic compound which is more alkaline than magnesium hydroxide is added into the magnesium salt solution or the solution which is prepared by dissolving solid magnesium salt with water, after reaction, a magnesium hydroxide slurry is obtained, or a filter cake of magnesium hydroxide is obtained after filtration; and
   2) preparation of magnesium bicarbonate solution: carbon dioxide is pumped into the magnesium hydroxide slurry obtained from the step 1) or a slurry which is prepared by adding water into the filter cake of magnesium hydroxide obtained from the step 1) for carbonation.

14. The precipitation method of metal ions according to claim 13, wherein the solid magnesium salt in the step 1) is at least one selected from the group consisting of magnesium chloride and magnesium nitrate.

15. The precipitation method of metal ions according to claim 13, wherein the magnesium salt solution in the step 1) is at least one solution selected from the group consisting of magnesium chloride, magnesium nitrate, magnesium acetate and magnesium citrate, or at least one selected from the group consisting of brine and seawater; a concentration of the magnesium salt solution is 10~300 g/L measured by weight of magnesium oxide.

16. The precipitation method of metal ions according to claim 13, wherein a concentration of said magnesium salt solution is 10~200 g/L measured by weight of magnesium oxide.

17. The precipitation method of metal ions according to claim 13, wherein the basic compound in the step 1) is at least one selected from the group consisting of calcium hydroxide, sodium hydroxide, potassium hydroxide, calcium hydroxide obtained from hydration of calcium oxide, and a mixture of calcium hydroxide and magnesium hydroxide obtained from hydration of light-burned dolomite.

18. The precipitation method of metal ions according to claim 13, wherein the basic compound in the step 1) is calcium hydroxide obtained from hydration of calcium oxide or a mixture of calcium hydroxide and magnesium hydroxide obtained from hydration of light-burned dolomite.

19. The precipitation method of metal ions mentioned in according to claim 13, wherein a quantity of said basic compound in the step 1) is 1~1.5 times of a theoretical stoichiometric amount, a reaction temperature is 15~95° C., and a reaction time is 10~180 minutes.

20. The precipitation method of metal ions according to claim 13, wherein during the process of adding water into the magnesium hydroxide slurry or the filter cake in the step 2), a weight ratio of water to magnesium oxide is 10~200:1; and during the carbonation process, a temperature is controlled at 0~35° C., a pure magnesium bicarbonate solution containing 5~30 g/L of magnesium oxide is obtained after filtration.

21. The precipitation method of metal ions mentioned according to claim 1, wherein said calcium bicarbonate solution is obtained as follows: at least one selected from the group consisting of calcium carbonate, limestone, marble and dolomite is sprayed directly by water and simultaneously carbon dioxide is introduced to perform carbonation, and thus pure calcium bicarbonate is obtained.

* * * * *